(12) United States Patent
Paek et al.

(10) Patent No.: US 9,099,949 B2
(45) Date of Patent: Aug. 4, 2015

(54) BACK ELECTROMOTIVE FORCE DETECTION CIRCUIT AND MOTOR DRIVING CONTROL APPARATUS USING THE SAME

(71) Applicant: SAMSUNG ELECTRO-MECHANICS CO., LTD., Suwon, Gyunggi-do (KR)

(72) Inventors: Hyun Paek, Gyunggi-do (KR); Joo Yul Ko, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 97 days.

(21) Appl. No.: 13/901,347

(22) Filed: May 23, 2013

(65) Prior Publication Data
US 2014/0176031 A1    Jun. 26, 2014

(30) Foreign Application Priority Data

Dec. 21, 2012 (KR) ........................ 10-2012-0151015

(51) Int. Cl.
| H02P 23/12 | (2006.01) |
| H02P 6/14 | (2006.01) |
| H02P 6/18 | (2006.01) |
| H02P 6/08 | (2006.01) |

(52) U.S. Cl.
CPC ................ *H02P 6/147* (2013.01); *H02P 6/145* (2013.01); *H02P 6/182* (2013.01); *H02P 6/187* (2013.01); *H02P 6/08* (2013.01); *H02P 6/085* (2013.01); *H02P 6/142* (2013.01)

(58) Field of Classification Search
CPC ............. H02P 6/142; H02P 6/06; H02P 6/08; H02P 6/085; H02P 6/145
See application file for complete search history.

(56) References Cited

U.S. PATENT DOCUMENTS

| 5,886,491 A * | 3/1999 | Yoshida et al. ................ 318/592 |
| 8,657,835 B2 * | 2/2014 | Boukhny et al. .............. 606/107 |
| 2007/0176567 A1 | 8/2007 | Maeda |
| 2012/0181959 A1* | 7/2012 | Otokawa et al. ......... 318/400.13 |

FOREIGN PATENT DOCUMENTS

| JP | 11-98883 A | 4/1999 |
| JP | 2011-010431 A | 1/2011 |

(Continued)

OTHER PUBLICATIONS

Korean Office Action with English translation thereof issued in Korean Application No. 10-2012-0151015 on Dec. 23, 2013.

(Continued)

*Primary Examiner* — Shawki S Ismail
*Assistant Examiner* — Bradley Brown
(74) *Attorney, Agent, or Firm* — McDermott Will & Emery LLP

(57) ABSTRACT

There are provided a back electromotive force detection circuit and a motor driving control apparatus using the same. The back electromotive force detection circuit includes a duty determining unit and a delay compensation unit. The duty determining unit outputs a differential level according to a duty of a driving control signal of a motor. The delay compensation unit performs delay compensation differently on each differential level to compensate for a delay in back electromotive force of the motor regardless of a variation in a duty of the driving control signal.

13 Claims, 6 Drawing Sheets

(56) References Cited

FOREIGN PATENT DOCUMENTS

| | | |
|---|---|---|
| JP | 2011-036083 A | 2/2011 |
| JP | 2012-034465 A | 2/2012 |
| JP | 2012152033 A | 8/2012 |
| KR | 2006-0068844 A | 6/2006 |
| KR | 10-0629007 B1 | 9/2006 |
| WO | 2005/117249 A1 | 12/2005 |

OTHER PUBLICATIONS

Japanese Office Action issued in Japanese Application No. 2013-108039 dated May 7, 2014, w/English translation.

* cited by examiner

BACK ELECTROMOTIVE FORCE DETECTION CIRCUIT AND MOTOR DRIVING CONTROL APPARATUS USING THE SAME

CROSS-REFERENCE TO RELATED APPLICATIONS

This application claims the priority of Korean Patent Application No. 10-2012-0151015 filed on Dec. 21, 2012 in the Korean Intellectual Property Office, the disclosure of which is incorporated herein by reference.

BACKGROUND OF THE INVENTION

1. Field of the Invention

The present invention relates to a back electromotive force detection circuit capable of accurately controlling driving of a motor by compensating for a delay in back electromotive force by performing delay compensation such that driving control signals have the same delay, while duties thereof are different, and a motor driving control apparatus using the same.

2. Description of the Related Art

In line with the development of motor technologies, motors having various sizes have been used in diverse technical fields.

In general, a motor is driven by rotating a rotor by using a permanent magnet and a coil having polarities thereof changed according to a current applied thereto. Initially, a brush type motor having a coil in a rotor was provided, which, however, had a problem in that a brush thereof was abraded or sparks could be generated.

Thus, recently, various types of brushless motor have been used globally. A brushless motor, eliminating mechanical contact units such as a brush, a rectifier, or the like, is a DC motor driven by using an electronic commutating mechanism instead. The brushless motor may include a stator configured as a permanent magnet and a rotor having coils corresponding to a plurality of phases and rotating by magnetic force generated by phase voltages of the respective coils.

In order to effectively drive a brushless motor, commutation of each phase (coil) of a rotor should be made at an appropriate timing, and for appropriate commutation, a position of a rotor is required to be recognized (i.e., known or detected).

In order to determine a position of a rotor, in the related art, an element such as a hall sensor, a resolver, or the like, is used, but, in this case, a driving circuit may be relatively complicated.

In order to complement this, a technique of driving a brushless motor by recognizing a position of a phase by using back electromotive force (BEMF), replacing a sensor, has been widely used.

However, in the case of using back electromotive force, delays are different according to duties of driving control signals controlling driving of a motor, having a limitation in that it is impossible to accurately detect back electromotive force.

Related art documents below relate to a brushless motor, which, however, do not disclose a technique for overcoming the limitation of back electromotive force in that delays may be different according to duties of driving control signals.

RELATED ART DOCUMENT (Patent document 1) Japanese Patent Laid Open Publication No. 2012-034465

(Patent document 2) Korean Patent Laid Open Publication No. 2006-0068844

SUMMARY OF THE INVENTION

An aspect of the present invention provides a back electromotive force detection circuit capable of accurately controlling driving of a motor by compensating for a delay in back electromotive force by performing delay compensation such that driving control signals have the same delay, while duties thereof are different, and a motor driving control apparatus using the same.

According to an aspect of the present invention, there is provided a back electromotive force detection circuit including a duty determining unit and a delay compensation unit. The duty determining unit may output a differential level according to a duty of a driving control signal of a motor. The delay compensation unit may perform delay compensation on each differential level differently in order to compensate for a delay in back electromotive force of the motor regardless of a variation in a duty of the driving control signal.

The duty determining unit may include a low pass filter receiving the driving control signal and filtering a frequency exceeding a pre-set band; and a converter converting an output from the low pass filter into a digital level.

The converter may be an analog-to-digital converter indicating the digital level by n number of bits.

The delay compensation unit may set a cutoff frequency to be different for each digital level.

The delay compensation unit may include n number of switches connected in parallel, wherein the switches may be connected to capacitors having different degrees of capacitance.

The delay compensation unit may switch at least a portion of the n number of switches to have capacitance in inverse proportion to a size of the digital level.

The n number may correspond to the number of phases of the motor.

According to an aspect of the present invention, there is provided a motor driving control apparatus. The motor driving control apparatus may include a driving signal generation unit, a back electromotive force detection unit, and a controller. The driving signal generation unit may provide a driving control signal to a motor. The back electromotive force detection unit may detect back electromotive force of the motor and compensate for a delay in the back electromotive force. The controller may determine a phase commutation timing of the motor by using the back electromotive force, and control the driving signal generation unit to generate the driving control signal by using the determined phase commutation timing.

The back electromotive force detection unit may include: a duty determining unit outputting a differential level according to a duty of the driving control signal; and a delay compensation unit performing delay compensation differently on each differential level to compensate for a delay in back electromotive force of the motor regardless of a variation in a duty of the driving control signal.

The duty determining unit may include: a low pass filter receiving the driving control signal and filtering a frequency exceeding a pre-set band; and a converter converting an output from the low pass filter into a digital level.

The converter may be an analog-to-digital converter indicating the digital level by n number of bits.

The delay compensation unit may set a cutoff frequency to be different for each digital level.

The delay compensation unit may include n number of switches connected in parallel, wherein the switches may be connected to capacitors having different degrees of capacitance.

The delay compensation unit may switch at least a portion of the n number of switches to have capacitance in inverse proportion to a size of the digital level.

The controller may determine a phase commutation timing of the motor in consideration of a delay uniformly compensated by the delay compensation unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
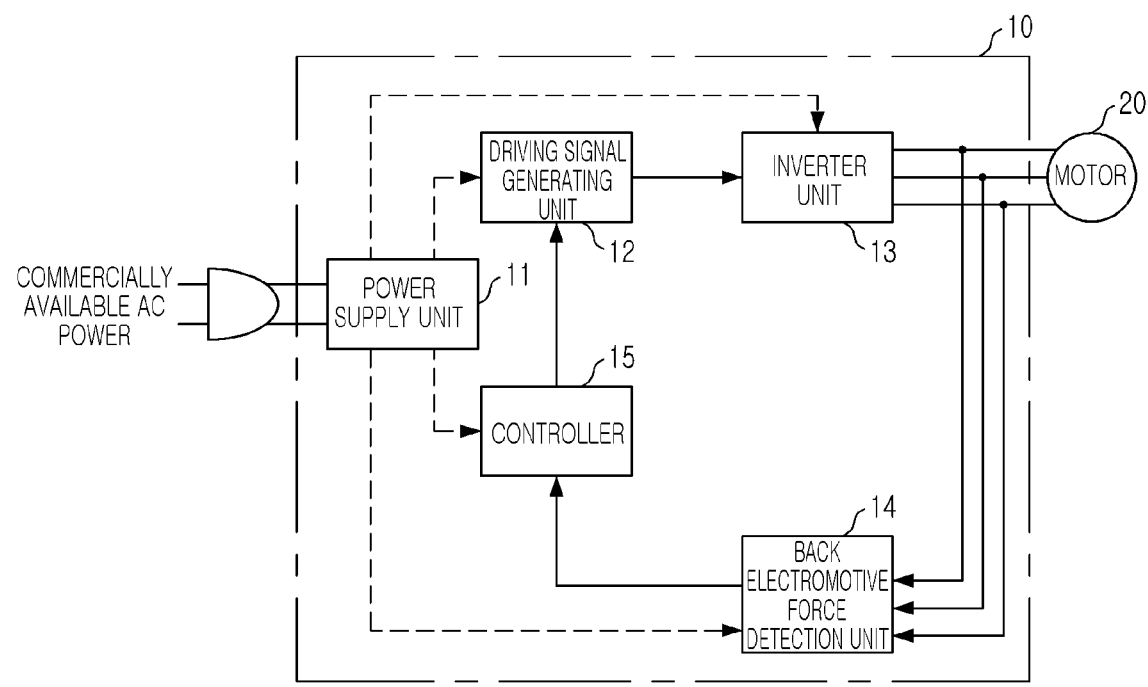
FIG. 1 is a schematic block diagram of a motor driving control apparatus according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic block diagram of a motor driving control apparatus according to an embodiment of the present invention.

Referring to FIG. 1, a motor driving control apparatus 10 may include a power supply unit 11, a driving signal generating unit 12, an inverter unit 13, a back electromotive force detection unit 14, and a controller 15.

The power supply unit 11 may supply power to the respective elements of the motor driving control apparatus 10. For example, the power supply unit 11 may convert an AC voltage of commercially available power into a direct current (DC) voltage and supply the same to the respective elements.

The driving signal generating unit 12 may provide a driving signal to the inverter unit 13. In an embodiment, the driving signal may be a pulse width modulation (PWM) signal.

The inverter unit 13 may control an operation of a motor 20. For example, the inverter unit 13 may convert a DC voltage into a multi-phase (e.g., 3-phase to 4-phase) voltage according to a driving signal and apply the same to coils (not shown) of the motor 20, respectively.

The back electromotive force detection unit 14 may detect back electromotive force of the motor 20. When the motor 20 is rotated, back electromotive force is generated in a coil provided in the rotor. In detail, back electromotive force is generated in a coil to which a phase voltage has not been applied, among a plurality of coils, and the back electromotive force detection unit 14 may detect back electromotive force generated by the respective coils of the motor device 160 and provide the same to the controller 15.

The controller 15 may control the driving signal generation unit 12 to generate a driving signal by using back electromotive force provided from the back electromotive force detection unit 14. For example, the controller 15 may control the driving signal generation unit 12 to perform phase commutation at a zero-crossing point of back electromotive force.

The motor 20 may rotate according to the driving signal. For example, the motor 20 may generate a magnetic field in each coil (stator) of the motor 20 by the current flowing in each phase provided from the inverter unit 13. The rotor (not shown) provided in the motor 20 may be rotated by the magnetic field generated from the respective coils.

Figure 2:
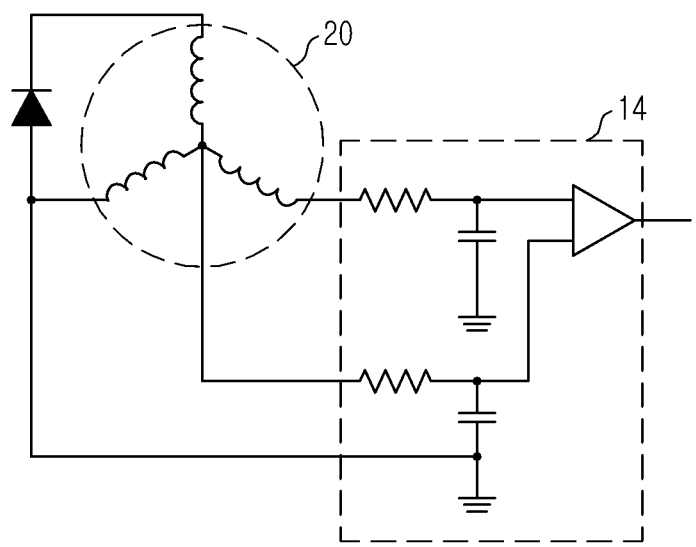
FIG. 2 is a circuit diagram illustrating an example of a back electromotive force detection unit.
Figure 3:
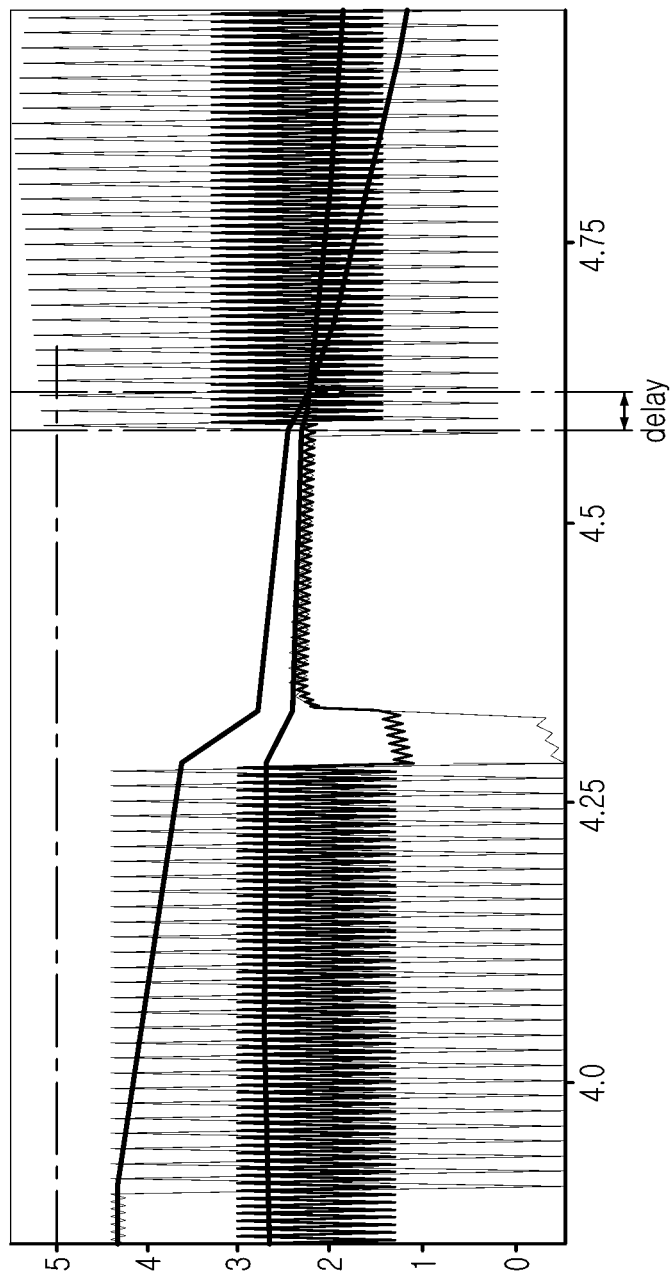
FIG. 3 is a graph showing back electromotive force detected by the back electromotive force detection unit of FIG. 2.

FIG. 2 is a circuit diagram illustrating an example of a back electromotive force detection unit, and FIG. 3 is a graph showing back electromotive force detected by the back electromotive force detection unit of FIG. 2.

The motor 20 illustrated in FIG. 2 has 3-phase coils, and a voltage is directly obtained from a neutral point of the 3-phase coils. However, according to an embodiment, a neutral point voltage may not be directly obtained and a virtual neutral point voltage may be obtained from the 3-phase coil.

The back electromotive force detection unit 14 may compare voltage polarities of the respective phases with the neutral point by a comparator and detect the back electromotive force as illustrated in FIG. 3. In the illustrated example, the back electromotive force detection unit 14 may include a low pass filter (LPF) including a resistor and a capacitor connected in parallel, and detect back electromotive force by making each of the pole voltages and the neutral point voltage pass through the foregoing LPF.

Here, the LPF may be used to filter driving control signals included in the pole voltages and the neutral point voltage but a certain delay as shown in FIG. 3 is generated due to such filter characteristics.

Also, such delays may have different values according to duties of driving control signals. Table 1 below shows delay times according to duties of driving control signals.

TABLE 1

| Duty | Delay time |
| --- | --- |
| 40% | 13.5 us |
| 60% | 23.8 us |
| 80% | 29.7 us |
| 100% | 46.2 us |

As shown in Table 1, it can be seen that as the duties are increased, delay times are lengthened. Difference between the delays may cause an error in controlling driving of the motor.

Namely, when a duty of a driving control signal is changed to control driving of the motor 20, a delay in back electromotive force is changed, causing a problem that an accurate phase commutation timing cannot be calculated.

Hereinafter, embodiments in which a delay in back electromotive force is uniformly compensated regardless of duty variations of driving control signals will be described.

In describing various embodiments of the present invention hereinafter, a description of content, the same or equivalent to that of the foregoing description with reference to FIGS. 1 through 3, will be omitted. However, a person skilled in the art will clearly understand details of the present invention.

Figure 4:
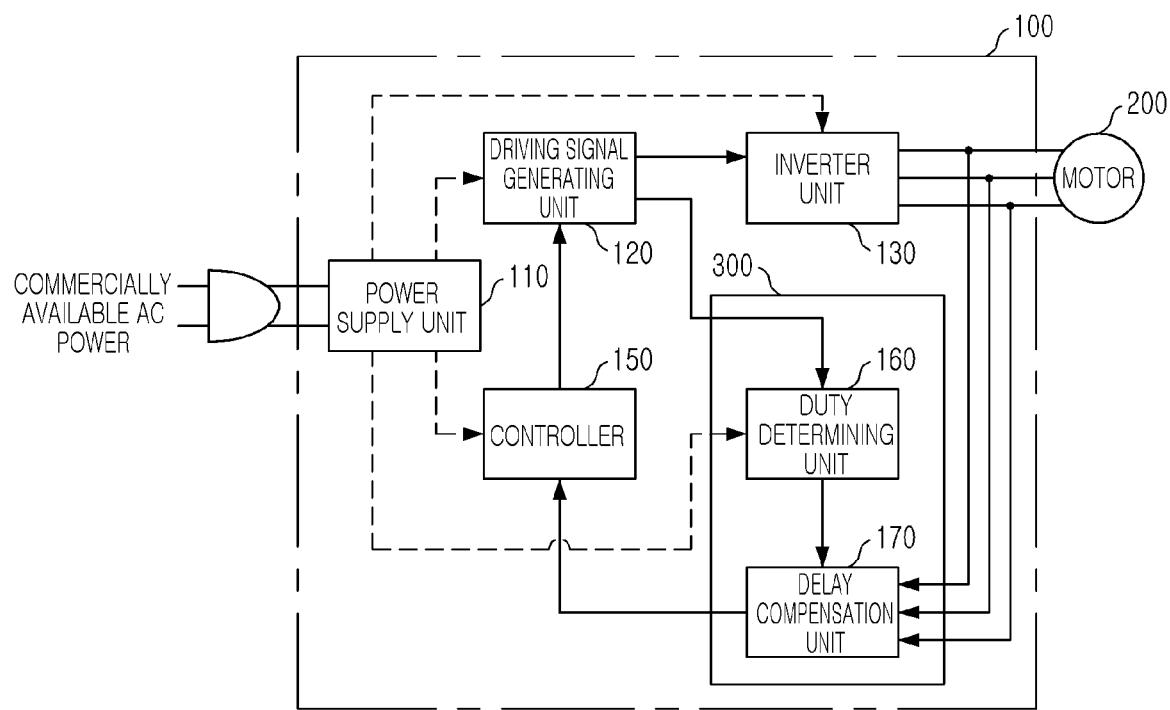
FIG. 4 is a view illustrating a configuration of a motor driving control apparatus according to an embodiment of the present invention.

FIG. 4 is a view illustrating a configuration of a motor driving control apparatus according to an embodiment of the present invention.

Referring to FIG. 4, a motor driving control apparatus 100 may include a power supply unit 110, a driving signal generation unit 120, an inverter unit 130, a controller 150, a duty determining unit 160, and a delay compensation unit 170.

The power supply unit 110 may supply power to each element of the motor driving control apparatus 100.

The driving signal generation unit 120 may provide a driving control signal to the motor 200. For example, the driving signal generation unit 120 may generate a pulse width modulation (PWM) signal having a variable duty as a driving control signal and provide the generated PWM signal to the motor 20.

The inverter unit 130 may apply a phase voltage to the motor 200 according to the driving control signal.

The controller 150 may receive delay-compensated back electromotive force from the delay compensation unit 170 and control the driving signal generation unit 120 to generate a driving control signal by using the received back electromotive force. For example, the controller 150 may determine a phase commutation timing of the motor 200 by using back electromotive force provided from the delay compensation unit 170, and control the driving signal generation unit 120 to generate a driving control signal by using the determined phase commutation timing.

The duty determining unit 160 and the delay compensation unit 170 may perform delay compensation on back electromotive force of the motor 200. Namely, the duty determining unit 160 and the delay compensation unit 170 may perform delay compensation such that driving control signals have the same delay, while having different duties.

To this end, the duty determining unit 160 may convert a duty of a current driving control signal into a predetermined value (level), and the delay compensation unit 170 may set a cutoff frequency to be different for each duty level of the driving control signal to thereby set uniform delay in back electromotive force.

The duty determining unit 160 and the delay compensation unit 170 may be configured as a single circuit unit. Namely, the duty determining unit 160 and the delay compensation unit 170 may operate as a single back electromotive force detection circuit 300 as in an example illustrated in FIG. 5.

Hereinafter, the duty determining unit 160 and the delay compensation unit 170 will be described in detail with reference to FIGS. 4 through 6.

The duty determining unit 160 may output a differential level according to a duty of a driving control signal from the motor 200.

In an embodiment, the duty determining unit 160 may include a low pass filter (LPF) 161 and an analog-to-digital converter (ADC) 162. Referring to FIG. 5, the LPF 161 may filter a frequency exceeding a pre-set band upon receiving a driving control signal.

Figure 5:
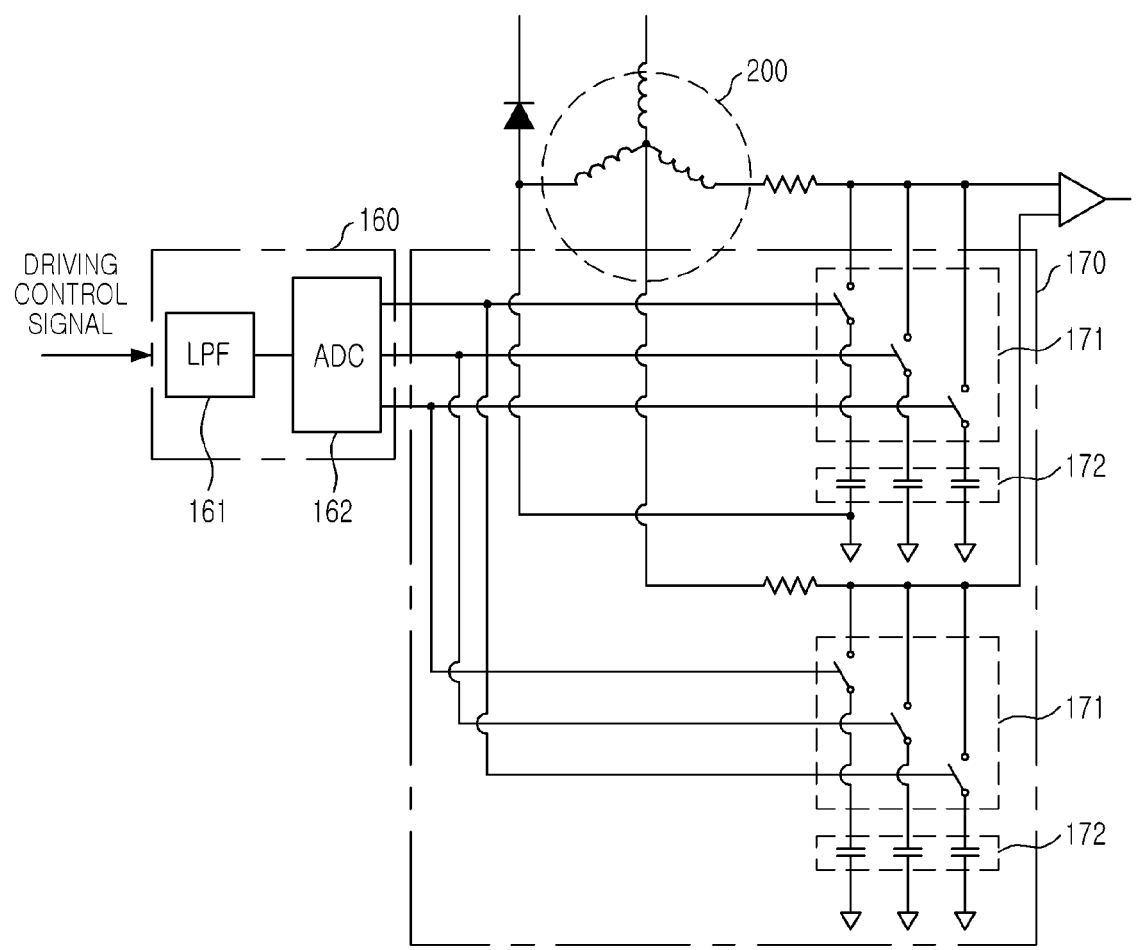
FIG. 5 is a circuit diagram illustrating a back electromotive force detection unit according to an embodiment of the present invention.
Figure 6:
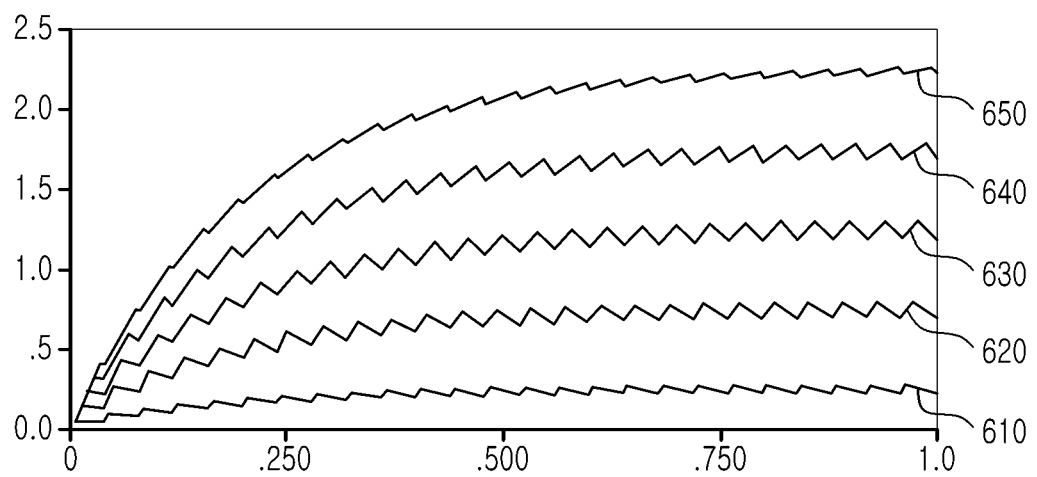
FIG. 6 is a graph showing examples of outputs of a low pass filter of FIG. 5.

FIG. 6 is a graph showing various examples of outputs of a low pass filter of FIG. 5. As illustrated, driving control signals 610 to 650 may have different levels according to duties. Namely, the LPF 161 may perform filtering such that the driving control signals have different levels according to duties.

The ADC 162 may convert an output from the LPF 161 into a digital level. The filtered value which has been converted into a digital level may be input to the delay compensation unit 170 including switches connected in parallel.

In an embodiment, the ADC 162 may indicate digital levels by n number of bits (n is a natural number). In the example illustrated in FIG. 5, the delay compensation unit 170 includes three switches connected in parallel, so the ADC 162 may output 3-bit digital value.

Here, n may correspond to the number of phases of the motor 200. Namely, the number of phases of the motor 200 and digital bits of the ADC 162 may be matched. In this case, a circuit configuration may be more simply implemented.

The delay compensation unit 170 performs different delay compensation on each differential level output from the duty determining unit 160 to compensate for a delay in back electromotive force of the motor 200 regardless of variations in duties of driving control signals.

In an embodiment, the delay compensation unit 170 may compensate for a delay by setting a cutoff frequency different for each duty of a driving control signal, i.e., each differential level output from the duty determining unit 160.

This is based on the fact that a delay time is lengthened as a cutoff frequency is lowered in the LPF, and a cutoff frequency may be changed by changing capacitance of the LPF.

This may be simplified as shown in Table 2 below.

TABLE 2

| Converter output | Resistance | Capacitance | Cutoff frequency |
| --- | --- | --- | --- |
| 001 | 10k | 1n | 15 kHz |
| 010 | 10k | 2n | 7.9 kHz |
| 011 | 10k | 3n | 5.3 kHz |
| 100 | 10k | 4n | 3.9 kHz |
| 101 | 10k | 5n | 3.1 kHz |
| 110 | 10k | 6n | 2.6 kHz |
| 111 | 10k | 7n | 2.2 kHz |

Referring to Table 2, as capacitances are increased, values of cutoff frequency are lowered. Thus, it can be seen that a delay time may be lengthened as capacitances are increased.

Also, as described above with reference to Table 1, as duties of driving control signals are increased, a delay time is lengthened.

Thus, the delay compensation unit 170 may uniformly compensate for a delay by decreasing capacitance when a duty of a driving control signal is large and increasing capacitance when a duty of a driving control signal is small.

In an embodiment, the delay compensation unit 170 includes n number of switches connected in parallel, and these switches may be connected to capacitors having different degrees of capacitance.

In the embodiment, the delay compensation unit 170 may switch at least a portion of the n number of switches so as to have capacitance in inverse proportion to an output from the duty determining unit 160, i.e., a size of a digital level of the ADC 162 in the foregoing example.

This will be described in more detail with reference to the example illustrated in FIG. 5. The delay compensation unit 170 may include the switches connected in parallel and capacitors 172 connected thereto, and the capacitor 172 may be connected to resistors according to operations of the switches 171 to constitute a low pass filter.

As set forth above, according to embodiments of the invention, even when duties of driving control signals are different, delay compensation is performed such that the driving control signals have the same delay, thereby compensating for a delay in back electromotive force to thus accurately control driving of a motor.

While the present invention has been shown and described in connection with the embodiments, it will be apparent to those skilled in the art that modifications and variations can be made without departing from the spirit and scope of the invention as defined by the appended claims.

What is claimed is:

1. A back electromotive force detection circuit comprising:
    a duty determining unit outputting a differential level according to a duty of a driving control signal of a motor; and
    a delay compensation unit performing delay compensation differently on each differential level to compensate for a delay in back electromotive force of the motor regardless of a variation in a duty of the driving control signal,
    wherein the delay compensation unit comprises n number of switches connected in parallel, and
    wherein the switches are connected to capacitors having different degrees of capacitance.

2. The back electromotive force detection circuit of claim 1, wherein the duty determining unit comprises:
    a low pass filter receiving the driving control signal and filtering a frequency exceeding a pre-set band; and
    a converter converting an output from the low pass filter into a digital level.

3. The back electromotive force detection circuit of claim 2, wherein the converter is an analog-to-digital converter indicating the digital level by n number of bits.

4. The back electromotive force detection circuit of claim 2, wherein the delay compensation unit sets a cutoff frequency different for each digital level.

5. The back electromotive force detection circuit of claim 1, wherein the delay compensation unit switches at least a portion of the n number of switches to have capacitance in inverse proportion to a size of the digital level.

6. The back electromotive force detection circuit of claim 1, wherein the n number corresponds to the number of phases of the motor.

7. A motor driving control apparatus comprising:
    a driving signal generation unit providing a driving control signal to a motor;
    a back electromotive force detection unit detecting back electromotive force of the motor and compensating for a delay in the back electromotive force; and
    a controller determining a phase commutation timing of the motor by using the back electromotive force, and controlling the driving signal generation unit to generate the driving control signal by using the determined phase commutation timing,
    wherein the back electromotive force detection unit comprises n number of switches connected in parallel, and
    wherein the switches include capacitors having different degrees of capacitance.

8. The motor driving control apparatus of claim 7, wherein the back electromotive force detection unit comprises:
    a duty determining unit outputting a differential level according a duty of the driving control signal; and
    a delay compensation unit performing delay compensation differently on each differential level to compensate for a delay in back electromotive force of the motor regardless of a variation in a duty of the driving control signal,
    wherein the delay compensation unit comprises the n number of switches that are connected in parallel and that include the capacitors having different degrees of capacitance.

9. The motor driving control apparatus of claim 8, wherein the duty determining unit comprises:
    a low pass filter receiving the driving control signal and filtering a frequency exceeding a pre-set band; and
    a converter converting an output from the low pass filter into a digital level.

10. The motor driving control apparatus of claim 9, wherein the converter is an analog-to-digital converter indicating the digital level by n number of bits.

11. The motor driving control apparatus of claim 9, wherein the delay compensation unit sets a cutoff frequency different for each digital level.

12. The motor driving control apparatus of claim 8, wherein the delay compensation unit switches at least a portion of the n number of switches to have capacitance in inverse proportion to a size of the digital level.

13. The motor driving control apparatus of claim 8, wherein the controller determines a phase commutation timing of the motor in consideration of a delay uniformly compensated by the delay compensation unit.

* * * * *